(12) United States Patent
Kamimura et al.

(10) Patent No.: US 10,514,908 B2
(45) Date of Patent: Dec. 24, 2019

(54) PROGRAM ANALYSIS DEVICE FOR CLASSIFYING PROGRAMS INTO PROGRAM GROUPS BASED ON CALL RELATIONSHIP BETWEEN PROGRAMS, PROGRAM ANALYSIS METHOD FOR CLASSIFYING PROGRAMS INTO PROGRAM GROUPS BASED ON CALL RELATIONSHIP BETWEEN PROGRAMS, AND RECORDING MEDIUM STORING ANALYSIS PROGRAM FOR CLASSIFYING PROGRAMS INTO PROGRAM GROUPS BASED ON A CALL RELATIONSHIP BETWEEN PROGRAMS

(71) Applicant: FUJITSU LIMITED, Kawasaki-shi, Kanagawa (JP)

(72) Inventors: Manabu Kamimura, Edogawa (JP); Akihiko Matsuo, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/938,475

(22) Filed: Mar. 28, 2018

(65) Prior Publication Data

US 2018/0300126 A1    Oct. 18, 2018

(30) Foreign Application Priority Data

Apr. 14, 2017   (JP) .................. 2017-080776

(51) Int. Cl.
*G06F 8/75*   (2018.01)
*G06F 8/36*   (2018.01)

(52) U.S. Cl.
CPC ...................................... *G06F 8/75* (2013.01)

(58) Field of Classification Search
None
See application file for complete search history.

(56) References Cited

U.S. PATENT DOCUMENTS

2004/0010734 A1* 1/2004 Ghercioiu ................. G06F 8/61
                                                                  714/38.13
2005/0125775 A1  6/2005 Fujikura
                       (Continued)

FOREIGN PATENT DOCUMENTS

JP   2005-173645   6/2005
JP   2013-148987   8/2013

*Primary Examiner* — Daxin Wu
(74) *Attorney, Agent, or Firm* — Staas & Halsey LLP

(57) ABSTRACT

A program analysis device includes: a memory that stores an analysis program; and a processor coupled to the memory, the processor preforms operations of: classifying, based on a call relationship between programs in a program asset including the programs and pieces of data, the programs into one or more program groups; generating, based on data which is accessed from the programs included in the program groups, one or more first service component candidates which associates the program groups with the pieces of data; extracting, as common data, data which is updated by another first service component candidate from among the pieces of data associated with the one or more first service component candidate; and setting one or more second service component candidates generated by removing the common data from the one or more first service component candidates and the common data as a service component of the program asset.

9 Claims, 14 Drawing Sheets

(56) References Cited

U.S. PATENT DOCUMENTS

| | | | | |
|---|---|---|---|---|
| 2005/0166193 A1* | 7/2005 | Smith | ................ | G06F 8/75 717/143 |
| 2009/0249307 A1* | 10/2009 | Yoshida | ................ | G06F 8/75 717/131 |
| 2012/0054363 A1* | 3/2012 | Hart | ................ | H04L 12/66 709/232 |
| 2013/0185300 A1* | 7/2013 | Kobayashi | ................ | G06F 8/74 707/737 |
| 2013/0246423 A1* | 9/2013 | Bhargava | ................ | G06F 21/56 707/737 |
| 2015/0269243 A1* | 9/2015 | Kobayashi | ................ | G06F 16/285 707/737 |

* cited by examiner

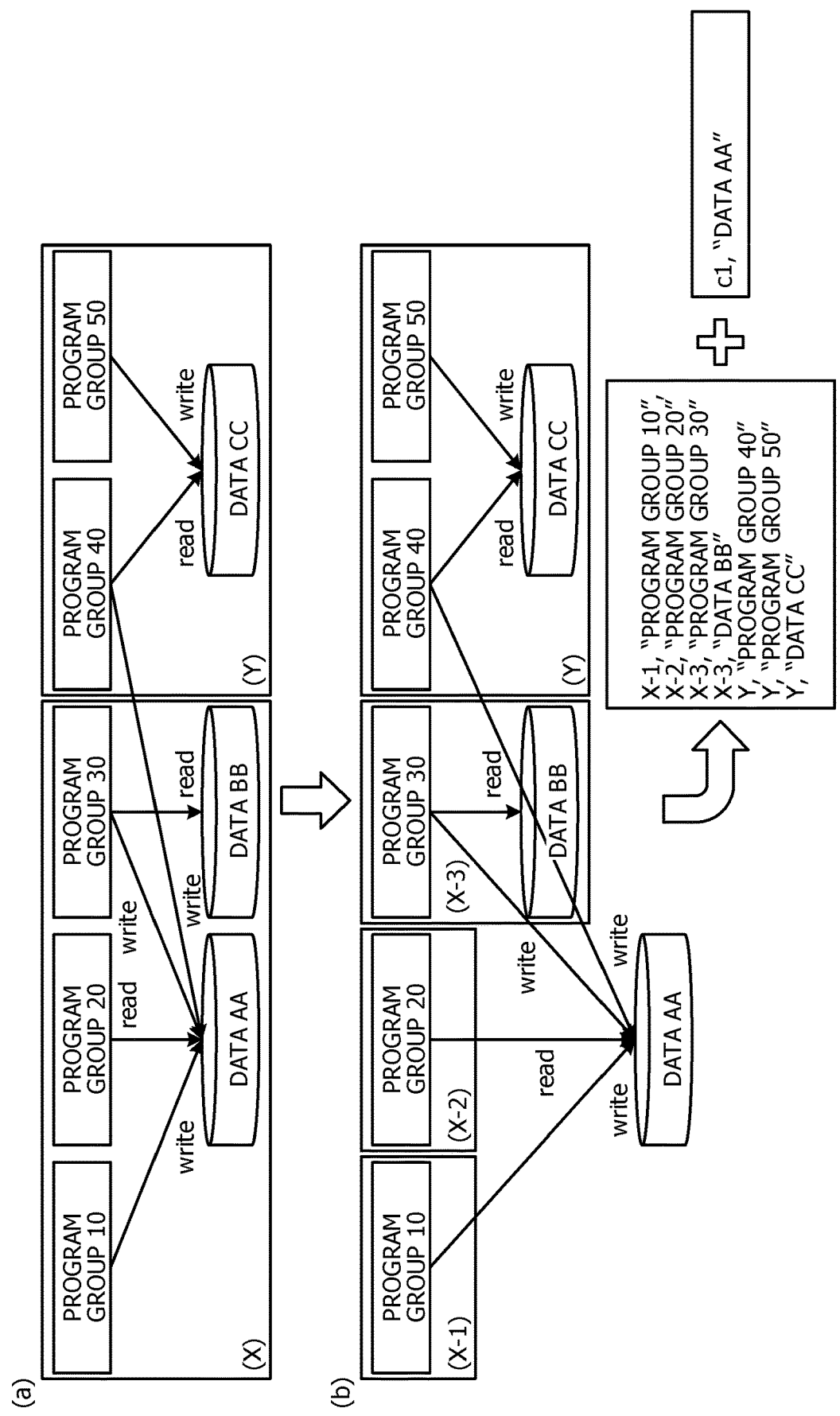

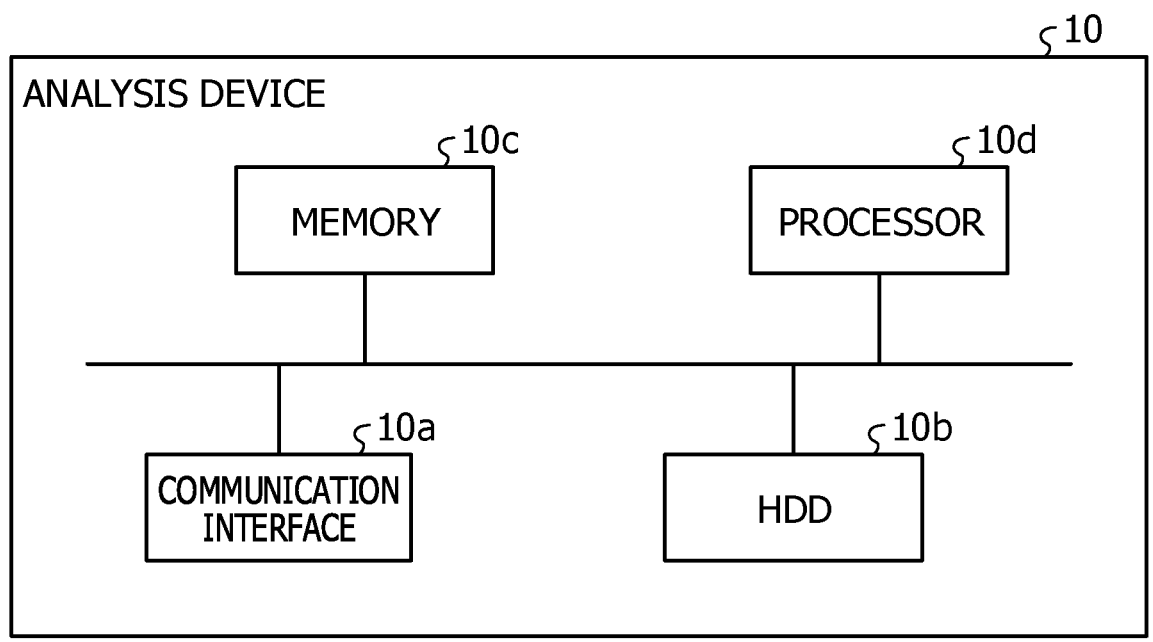

PROGRAM ANALYSIS DEVICE FOR CLASSIFYING PROGRAMS INTO PROGRAM GROUPS BASED ON CALL RELATIONSHIP BETWEEN PROGRAMS, PROGRAM ANALYSIS METHOD FOR CLASSIFYING PROGRAMS INTO PROGRAM GROUPS BASED ON CALL RELATIONSHIP BETWEEN PROGRAMS, AND RECORDING MEDIUM STORING ANALYSIS PROGRAM FOR CLASSIFYING PROGRAMS INTO PROGRAM GROUPS BASED ON A CALL RELATIONSHIP BETWEEN PROGRAMS

CROSS-REFERENCE TO RELATED APPLICATION

This application is based upon and claims the benefit of priority of the prior Japanese Patent Application No. 2017-080776, filed on Apr. 14, 2017, the entire contents of which are incorporated herein by reference.

FIELD

The embodiments discussed herein are related to a program analysis device, a program analysis method, and a recording medium storing an analysis program.

BACKGROUND

Computer systems are utilized in various scenarios due to the development of the computer systems. It may be desirable that the established computer system be improved or the whole system be revised over time.

Japanese Laid-open Patent Publication No. 2013-148987 and Japanese Laid-open Patent Publication No. 2005-173645 are related arts.

SUMMARY

According to an aspect of the invention, a program analysis device includes: a memory that stores an analysis program; and a processor coupled to the memory, the processor, based on the analysis program, performs operations of: classifying, based on a call relationship between programs in a program asset including the programs and pieces of data, the programs into one or more program groups; generating, based on data which is accessed from the programs included in the one or more program groups, one or more first service component candidates which associates the one or more program groups with the pieces of data; extracting, as common data, data which is updated by another first service component candidate from among the pieces of data associated with the one or more first service component candidate; and setting one or more second service component candidates generated by removing the common data from the one or more first service component candidates and the common data as a service component of the program asset.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is a diagram illustrating an example of re-classification of candidate service components; and FIG. 14 is a diagram illustrating an example of a hardware configuration.

DESCRIPTION OF EMBODIMENTS

Figure 1:
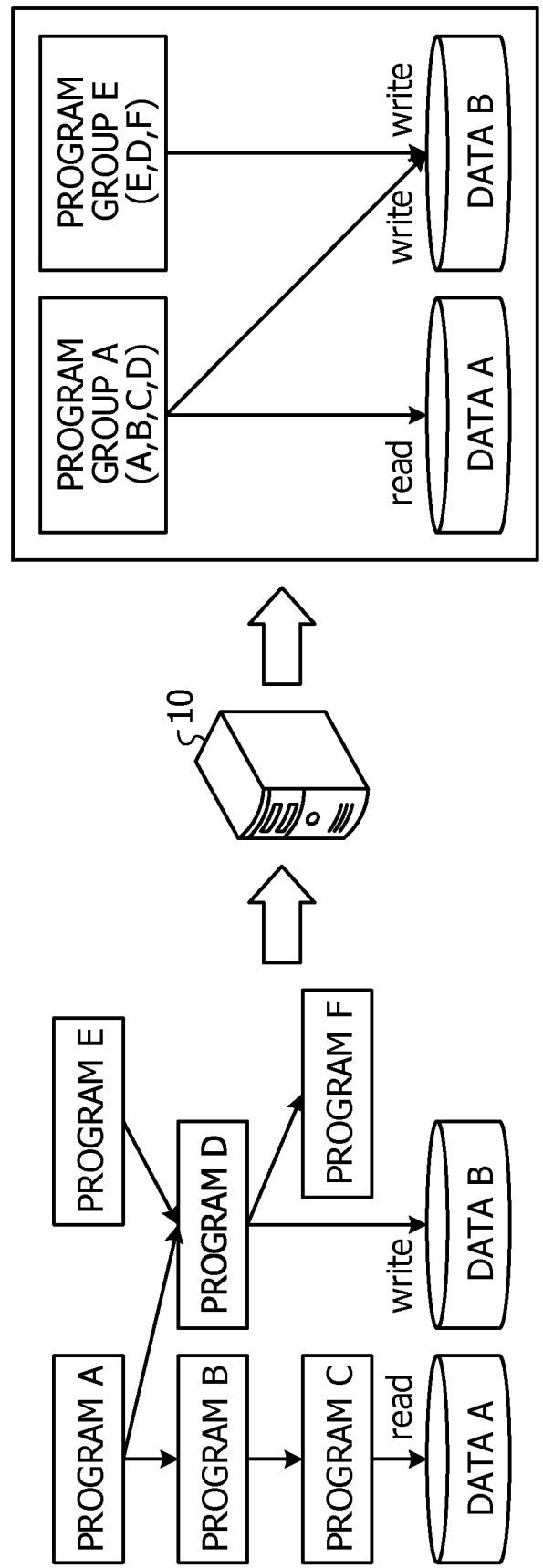
FIG. 1 is a diagram illustrating an example of an analysis device.

Computer Systems are used widely in many situations. Computer systems which are once constructed may be necessary to be fixed or may be improved when it is running for a long time. In such case, when an already-created program is needed to be partially modified, it is desirable that the specification of an existing system be understood. Although, the specification becomes complicated as software increases in a scale, and therefore, it may be difficult to grasp and change the specification. Also, when a huge number of programs are targeted for modification, the number of relationships between programs and the number of relationships between the programs and pieces of data also greatly increase, and therefore, it may be difficult to divide the software in accordance with all of the relationships.

In recent years, in a large-scale system, there is an technology which divides the software into understandable subsets (service components), and a subset is automatically extracted in accordance with a call relationship between programs. For example, a subset is extracted in accordance with the following requirements. In one requirement, in a case in which an important entity that becomes a main subject used to express a role meant for a subset and a dependent relationship between entities are included in the subset. In another requirement, an unimportant entity that hinders understanding of the main subject of the software and a dependent relationship between entities are considered less related when a subset is formed.

Although, there is a case in which classification may be performed such that a relationship between service components is not accurately represented because an element that may be included in a certain service component is grouped so as to be included in another service component. For example, when extraction in a unit of a component is performed on data that is an element in a service component while a strong relationship of the data with processing outside the service component remains, the extracted component may not be extracted as an independent component that provides a service.

For example, by the technology described above, if an entity that seems to be considered less related but may characterizes a divided group, the software division is performed such that the entity is included in the group. As described above, grouping is determined in accordance with a relative comparison with the other relationships, such that process of updating data from outside may remain because such data are included in the divided subset.

In one aspect, a program analysis device or the like will be provided that classifies as an independent component appropriately in a program asset.

Embodiments of a program analysis device, a program analysis method, and an analysis program of the technology discussed herein are described in detail with reference to drawings. The embodiments do not limit the technology discussed herein. In addition, the embodiments may be appropriately combined within a range without contradiction.

FIG. 1 is a diagram illustrating an example of an analysis device. An analysis device 10 executes loose coupling analysis for a program asset including two or more programs and two or more pieces of data. In other words, the analysis device 10 grasps the internal structure of the program asset and reorganizes functions and pieces of data into forms each of which is easily extracted as a service.

A program asset applied to a certain system is updated due to a modification or an extension of the system, or a change in a peripheral environment such as a network or the like. Due to long-time usage of the system, addition of components (elements) such as a program and a database (DB) to the program asset, a change in components in the program asset, and the like, are performed over time. The above-described update of the program asset over time is performed by two or more persons, and therefore, there may be no accurate management materials (update materials) or the like. Therefore, it may not be easy for a system engineer or a programmer to analyze and grasp how components relate to other components in the program asset, and which component is affected by update of a component, with reference to the entire program asset, when reverse engineering, analysis of a program structure, or the like, is performed.

In such a case, the analysis device 10 classifies two or more programs into program groups in accordance with a call relationship between the two or more programs in the program asset. In the next step, the analysis device 10 generates two or more candidate service components in each of which each program group is associated with pieces of data, in accordance with pieces of data accessed from programs included in the program groups. From among pieces of data associated with the two or more candidate service components, the analysis device 10 extracts data updated by another candidate service component as common data and generates two or more candidate service components not including common data and the common data as service components (processing) of the program asset.

In other words, the analysis device 10 componentizes a program and data by different approaches. It is assumed that, a program is allowed to be duplicated as a component used to be copied such as a library, and pieces of data are componentized so as to be arranged in one place because each of the pieces of data has a specific value. The analysis device 10 performs the componentization by using a clustering technology such as a software division technology, and defines data as "common data" which are updated by a source outside of the corresponding component and data not updated by any source but referred to by two or more components outside the component. After the definition of the componentized programs and pieces of data, device 10 defines the components having a loose relationship after excluding "common data" which have been extracted.

For example, as illustrated in FIG. 1, in a program asset constituted by programs A to F and pieces of data A and B, the analysis device 10 generates a program group A including the programs A, B, C, and D and a program group E including the programs E, D, and F in accordance with a call relationship of the programs. The analysis device 10 identifies relationships between program groups and pieces of data referred to or updated by programs included in the program groups. The analysis device 10 outputs information indicating the relationships between the program groups and the pieces of data that have been classified.

As a result, the analysis device 10 defines data updated by a source outside of the corresponding component including the data as "common data". An independent "component" is extracted as an element by removing "common data" from the corresponding candidate service component and newly defining a unit of cut-out component. Therefore, a component less related to the other components in the program asset may be classified appropriately.

Figure 2:
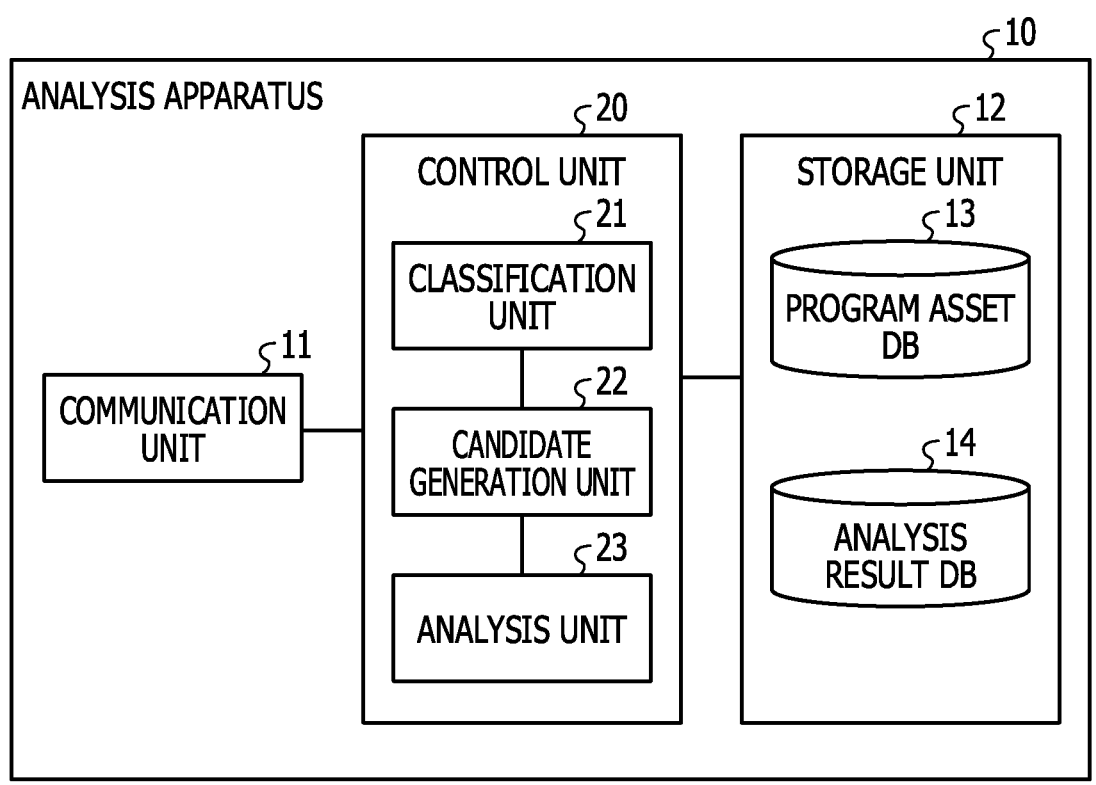
FIG. 2 is a diagram illustrating an example of a function configuration of the analysis device.

FIG. 2 is a diagram illustrating an example of a function configuration of the analysis device. As illustrated in FIG. 2, the analysis device 10 includes a communication unit 11, a storage unit 12, and a control unit 20.

The communication unit 11 is a processing unit that controls communication with another device, and is, for example, a communication interface or the like. For example, the communication unit 11 accepts an instruction of processing start and an input of a program asset that is an analysis target from an administrator terminal. The communication unit 11 transmits an analysis result to the administrator terminal or the like.

The storage unit 12 is an example of a storage device that stores programs and pieces of data, and is, for example, a memory, a hard disk, or the like. The storage unit 12 includes a program asset DB 13 and an analysis result DB 14.

Figure 3:
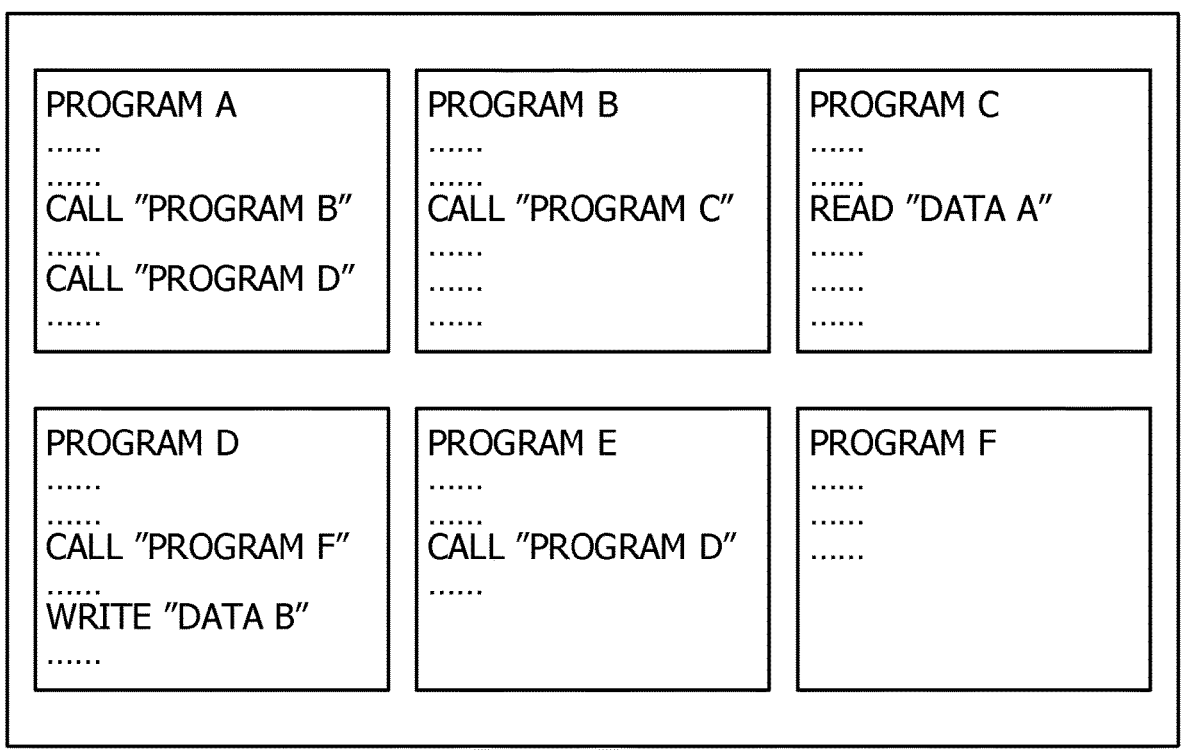
FIG. 3 is a diagram illustrating an example of programs stored in a program asset database (DB)

The program asset DB 13 is a DB that stores a program asset that is an analysis target. The program asset is stored by an administrator or the like. FIG. 3 is a diagram illustrating an example of the entire programs stored in the program asset DB 13. As illustrated in FIG. 3, the program asset includes programs A, B, C, D, E, and F. In FIG. 3, the six programs are schematically illustrated, and only program calling parts and data accesses are described.

As illustrated in FIG. 3, the program A calls the programs B and D to execute processing. Similarly, the program B calls the program C, and the program C execute processing to read or refer to data A. The program D calls the program F and writes data onto data B. The program E calls the program D, and the program F has no call relationship and no data reference relationship. The program asset illustrated in FIG. 3 may be a part of the program asset that is the analysis target, and may also include another program.

The analysis result DB 14 is a DB that store an analysis result of the program asset, which has been obtained by the control unit 20. For example, the analysis result DB 14 stores an identifier indicating the program asset, an analysis result, an analysis date and time, and the like such that these pieces of information are associated with each other.

The control unit 20 is a processing unit that controls the whole analysis device 10, and is, for example, a processor or the like. The control unit 20 includes a classification unit 21, a candidate generation unit 22, and an analysis unit 23. The classification unit 21, the candidate generation unit 22, and the analysis unit 23 is an example of an electronic circuit included in the processor, an example of a process executed by the processor, or the like.

The classification unit 21 is a processing unit that classifies programs into program groups in accordance with a call relationship between the programs in the program asset. For example, the classification unit 21 obtains a call relationship between the programs and relationships between the programs and pieces of data by using the program asset as an input. The classification unit 21 obtains related programs when a single piece of processing is executed. The classification unit 21 determines a program not called by any of the other programs to be a start point and creates the entire call structure of the programs in accordance with the programs related to the processing by tracking the call relationship from the program that is the start point to define a "program group". After that, the classification unit 21 creates relationships between the program group and pieces of data in accordance with the relationships between the programs and the pieces of data.

For example, the classification unit 21 creates a call structure of the programs for the program asset illustrated in FIG. 3. The call structure of the programs is determined after a start point of the programs has been determined. The classification unit 21 obtains the program A as a start point because the program A is not called by any of the other programs and determines the program B not to be a start point because the program B is called by another program, that is, the program A. Similarly, the classification unit 21 determines the program C not to be a start point because the program C is called by the program B and determines the program D not to be a start point because the program D is called by the program A. However, the classification unit 21 determines the program E to be a start point because the program E is not called by any of the other programs. In addition, the classification unit 21 determines the program F not to be a start point because the program F is called by the program D. As a result, the classification unit 21 identifies the program A and the program E as the start points.

Next, the classification unit 21 creates a call structure by using the program A as the start point. The program A calls the programs B and D. The program B calls the program C, and the program D calls the program F. Therefore, the program A may be determined to have a call structure with the programs B, C, D, and F. Thus, the classification unit 21 classifies the programs B, C, D, and F allowed to be tracked from the program A into a program group A by using the program A as the start point.

Similarly, the program E calls the program D, and the program D calls the program F, such that the program E may be determined to have a call structure with the programs D and F. Thus, the classification unit 21 classifies the programs D and F allowed to be tracked from the program E into a program group E by using the program E as the start point.

The classification unit 21 associates each of the program groups with pieces of data accessed from the program group. For example, the program C that refers to the data A and the program D that updates the data B are a part of the program group A. Therefore, the classification unit 21 defines a relationship in which the program group A refers to the data A and updates the data B. The classification unit 21 defines, for the program group E, only a relationship in which the program group E updates the data B because the program group E includes the program D.

Figure 4:
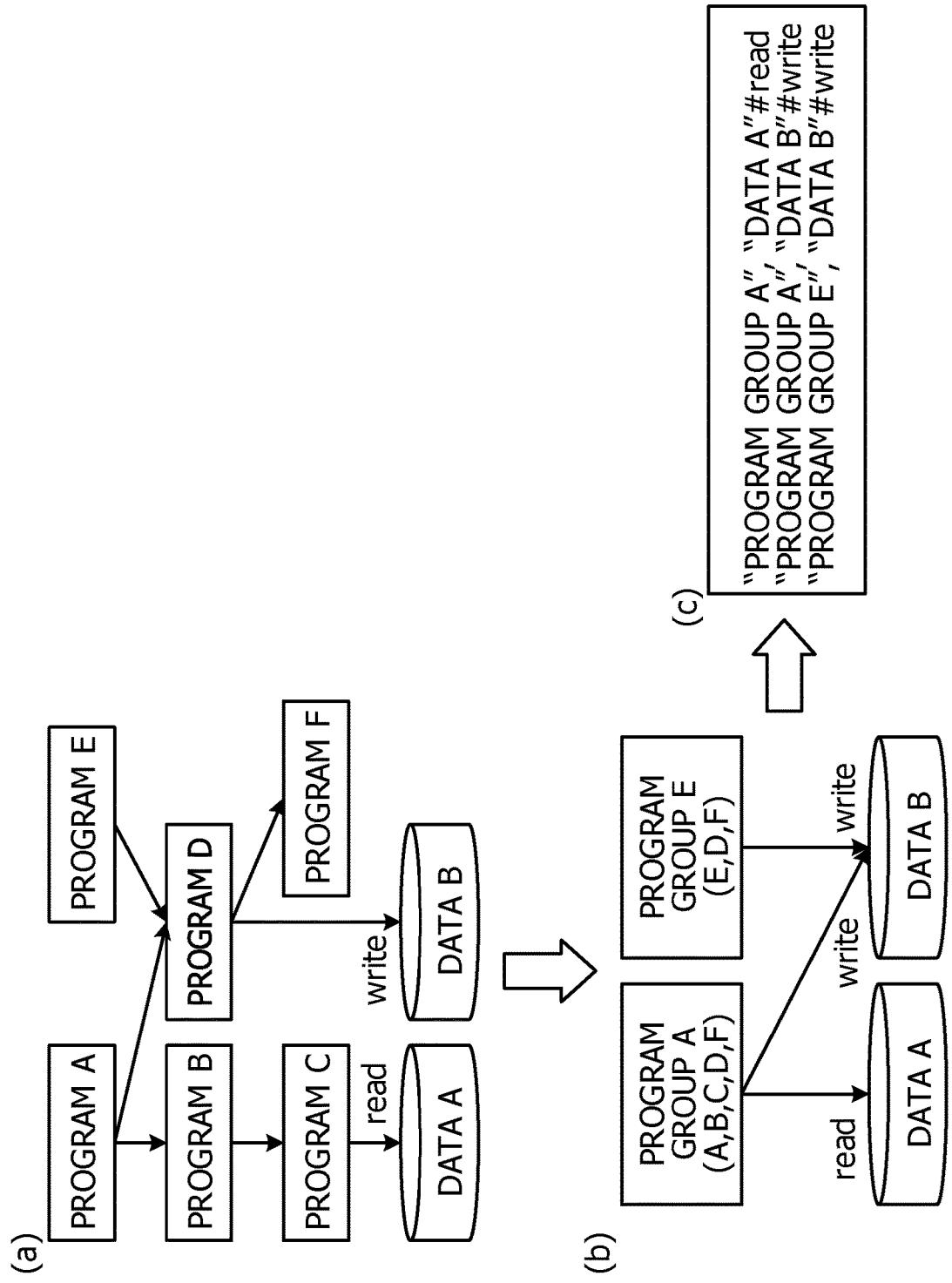
FIG. 4 is a diagram illustrating an example of a call structure and classification of the programs.

A result of such classification is illustrated in FIG. 4. FIG. 4 is a diagram illustrating an example of a call structure and classification of the programs. As illustrated in (b) of FIG. 4, the classification unit 21 generates a relationship in which the program group A refers to the data A and updates the data B and a relationship in which the program E updates the data B in accordance with the call relationship illustrated in (a) of FIG. 4 and outputs the relationships to the storage unit 12 and the candidate generation unit 22. The output format is not limited to such an example. As the output format, various formats may be employed depending on a tool or the like of an output destination. For example, as illustrated in (c) of FIG. 4, relationship formation is defined by comma-delimitation, and the relationship may be described as "program group, data, a reference relationship as #read, or an update relationship as #write". For example, the first line of (c) of FIG. 4 states that the program group A refers to (reads) the data A.

The candidate generation unit 22 is a processing unit that generates candidate service components each of which is a subset obtained by grouping program groups and pieces of data related to each other in accordance with relationships between the pieces of data and the program groups that have been classified by the classification unit 21. For example, the candidate generation unit 22 may generate candidate service components by the clustering technology discussed in Japanese Laid-open Patent Publication No. 2013-148987, or the like. In the clustering technology, an important entity that becomes a main subject used to express a role meant for a subset and a dependent relationship between entities are included in the subset. An unimportant entity that hinders understanding of the main subject of the software and a dependent relationship between entities are considered less serious when a subset is formed. Whether an entity is important or not is determined in accordance with the number of dependent relationships.

For example, the candidate generation unit 22 may determine a program group to have a strong relationship with each data as the number of inputs to the data increases, and generate a candidate service component such that the program group and the data having a strong relationship are included in the same group. The candidate generation unit 22 may determine a relationship between data and a program group by putting more weight on "Write" compared to "Read" from among the inputs, and for example, doubling the weight of "Write" compared to the weight of "Read" to generate a candidate service component.

Figure 5:
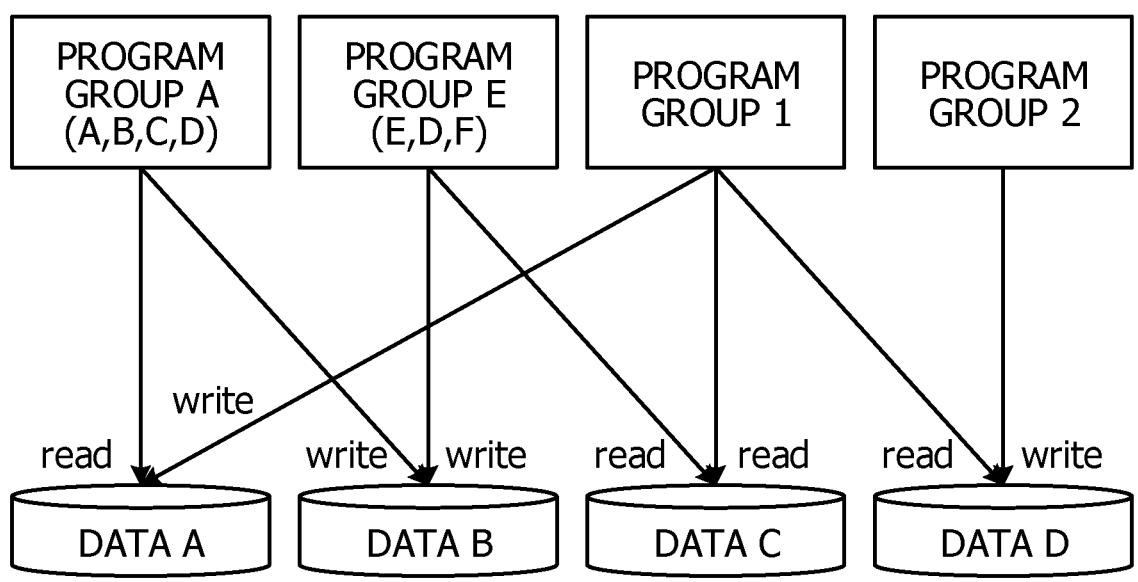
FIG. 5 is a diagram illustrating an example of generation of candidate service components.

The result that has been output from the classification unit 21 is illustrated in FIG. 5. FIG. 5 is a diagram illustrating an example of generation of candidate service components. In this example, as illustrated in FIG. 5, it is assumed that components related to the program groups A and E, and the pieces of data A and B such as program groups 1 and 2, and pieces of data C and D are input to the candidate generation unit 22 in addition to the program groups A and E, and the pieces of data A and B.

The candidate generation unit 22 generates relationships between the program groups and the pieces of data by using a formula (1). Here, "E (A,B)" in the formula (1) indicates an essentiality (weight) of a dependent relationship from an entity A to an entity B, "d_in (B)" indicates an in-number to the entity B, and "n" becomes 2 when the data corresponds to "reference" and becomes 1 when the data corresponds to "update".

$$E(A,B)=1/(n \times d\_in(B)) \qquad (1)$$

In other words, data read from many programs is determined to have a weak relationship with the programs, and a relationship between a data update program and updated data is determined to be strong. The data read from many programs is generated so as to be included in one of subsets (candidate service components). For example, each of the program groups A and E updates the data B, such that each of the program groups A and E may be determined to have a stronger relationship with the data B than the other pieces of data. The program group 1 updates the data A but also accesses other pieces of data, such that the relationship between the program group 1 and each of the pieces of data may be determined not to be so strong. The program group 2 updates the data D, such that the program group 2 may be determined to have a stronger relationship with the data D than relationships with the other pieces of data.

Figure 6:
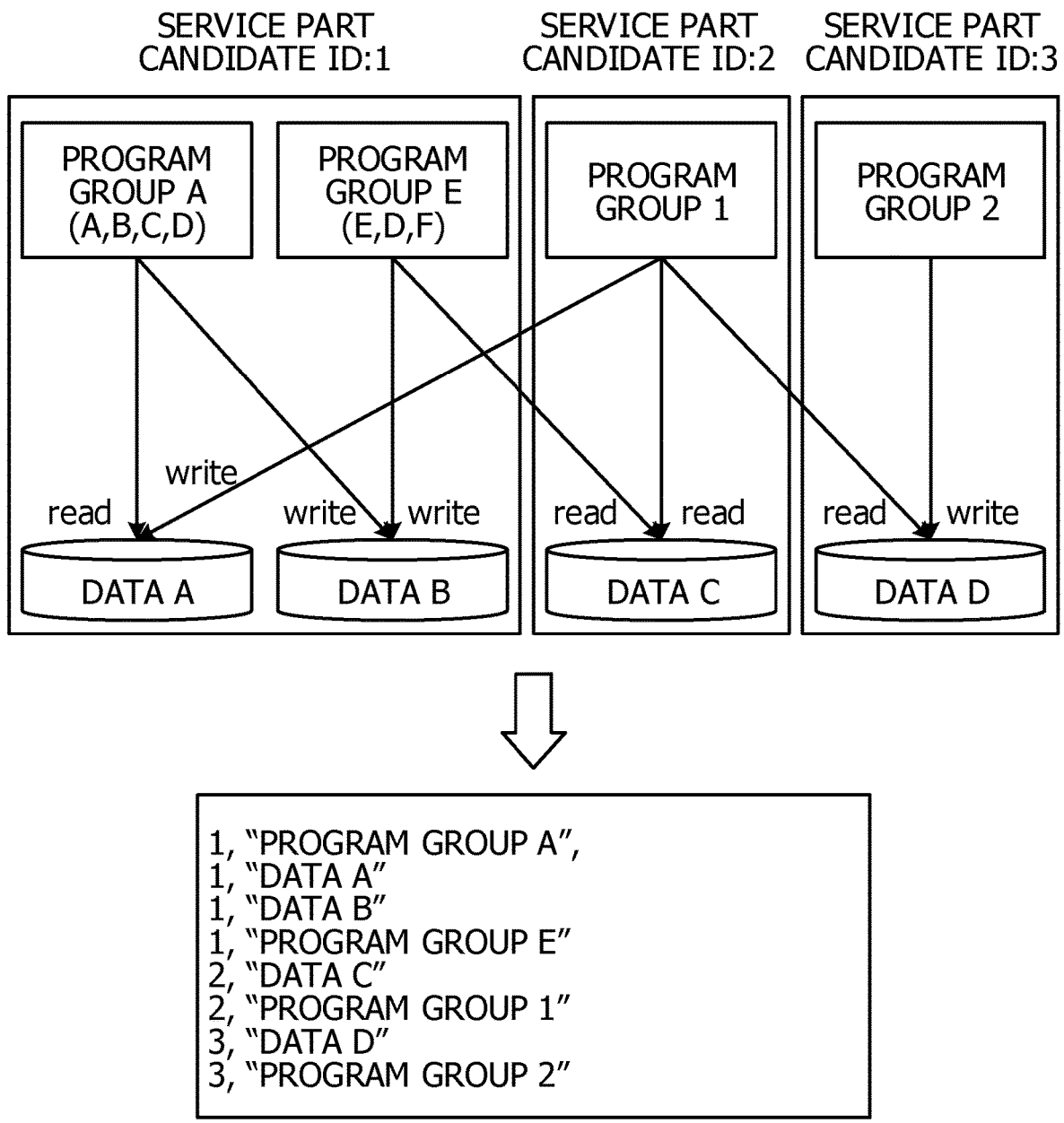
FIG. 6 is a diagram illustrating an example of a generation result of the candidate service components.

A result of the clustering by the candidate generation unit 22 is illustrated in FIG. 6. FIG. 6 is a diagram illustrating an example of a generation result of the candidate service components. As illustrated in FIG. 6, the candidate generation unit 22 generates three candidate service components such as a candidate service component (ID=1) including the program groups A and E and the pieces of data A and B, a candidate service component (ID=2) including the program group 1 and the data C, a candidate service component (ID=3) including the program group 2 and the data D. The candidate generation unit 22 may also generate "(1, program group A), (1, data A), (1, data B), (1, program group E), (2, data C), (2, program group 1), (3, data D), (3, program group 2)" or the like, as a list in which each of the candidate service component IDs is associated with the corresponding components. After that, the candidate generation unit 22 outputs the generated candidate service components to the storage unit 12 and the analysis unit 23.

The analysis unit 23 is a processing unit that extracts, as common data, data updated by another candidate service component, from among pieces of data associated with the two or more candidate service components, and generates the two or more candidate service component not including common data and the common data as service components of the program asset. The analysis unit 23 is a processing unit that extracts, as common data, data not updated by a program group in the candidate service component including the data and also not updated by a program group in another candidate service components, from among the pieces of data associated with the two or more candidate service components. As the result, the analysis unit 23 outputs the pieces of common data and the final service components by using the obtained candidate service components and reference/update relationships between the program groups and the pieces of data.

In FIG. 6, the analysis unit 23 obtains a candidate service component and determines update processing for data of the candidate service component. For example, the analysis unit 23 detects and obtains pieces of data A and B in the candidate service component (ID=1), and determines that the data A is updated by the program group 1. At this time, the analysis unit 23 determines that each of the program groups A and E corresponds to processing in the same service component (ID=2) as the data A, but the program group 1 corresponds to processing in another candidate service component (ID=2). Thus, the analysis unit 23 determines the data A to be data updated by a source outside of the candidate service component (ID=1), classifies the data A as common data, and defines the data A outside the candidate service component (ID=1). Here, the data A is data updated by each candidate service component, and thus the data A may be defined as global access data.

The analysis unit 23 determines whether another data exists in the candidate service component (ID=1) and determines a reference/update relationship for the data B because the data B is included in the candidate service component (ID=1). For example, the data B is updated by the program groups A and E, but is not updated by processing (candidate service component) different from the candidate service component (ID=1) including the data B. Each of the program groups A and E corresponds to processing in the candidate service component (ID=1), and there is no access to the data B from outside of the candidate service component (ID=1). The analysis unit 23 determines that the data B does not correspond to data sent outside the candidate service component (ID=1) because the data B is not data only for "reference".

Thus, the analysis unit 23 defines the data A outside the candidate service component (ID=1) as common data. The analysis unit 23 checks whether a relationship does not exist in the candidate service component (ID=1) because the data A is no longer data of the candidate service component (ID=1). The analysis unit 23 determines that the program groups A and E are not divided because the program groups A and E and the data B are left as elements, and are related to each other such that each of the program groups A and E updates the data B.

The analysis unit 23 investigates data of the candidate service component (ID=2). The analysis unit 23 detects the data C in the candidate service component (ID=2) and investigates accesses to the data C from the program groups. Here, the analysis unit 23 determines that the data C is only referred to by the program groups E and 1, and the program group E is an external candidate service component different from the candidate service component (ID=2). As a result, the analysis unit 23 defines the data C outside the candidate service component (ID=2) as common data. Here, the data C is data only referred to by each of the candidate service components, such that the data C is defined as master data. After that, the analysis unit 23 defines the candidate service component (ID=2) only with the program group 1 because only the program group 1 is left in the candidate service component (ID=2) as an element.

After that, the analysis unit 23 investigates data of the candidate service component (ID=3). The analysis unit 23 detects the data D in the candidate service component (ID=3). The analysis unit 23 determines that the data D is updated by the program group 2 and referred to by the program group 1. The program group 2 and the data D are the elements in the same candidate service component (ID=3), such that the analysis unit 23 determines that the data D is not updated by a source outside of the candidate service component (ID=3) and updated only by the program group 2. The analysis unit 23 determines that the data D is not data only referred to because the data D is updated. Thus, the analysis unit 23 determines that the data D is not classified as common data.

Figure 7:
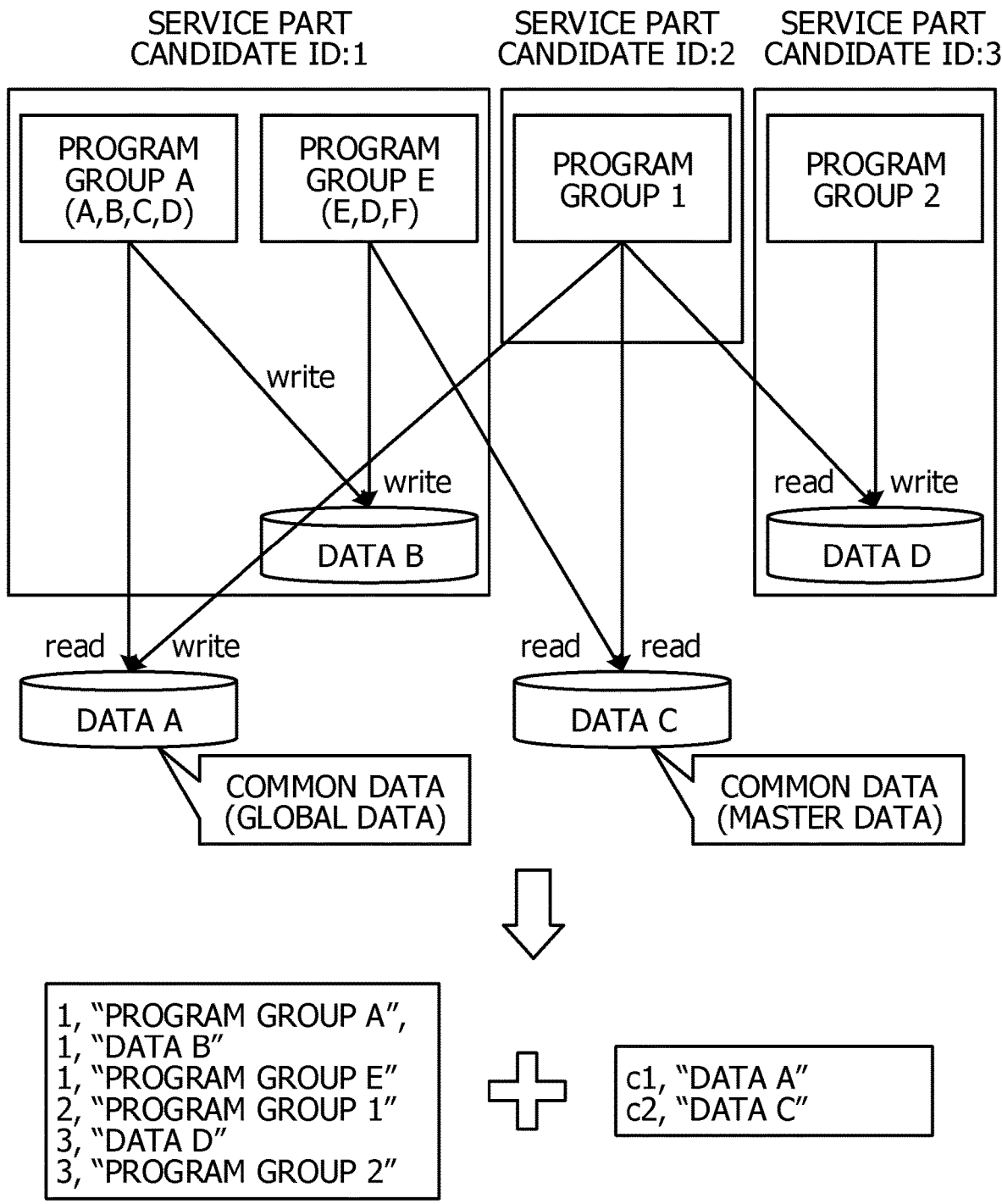
FIG. 7 is a diagram illustrating an example of a generation result of service components.

The result that has been generated by the above-described processing is illustrated in FIG. 7. FIG. 7 is a diagram illustrating an example of the generation result of service components. As illustrated in FIG. 7, the analysis unit 23 re-classifies the data A that has been included in the candidate service component (ID=1) outside the candidate service component (ID=1) as common data because the data A is updated by the program group 1 of the external candidate service component (ID=2). Similarly, the analysis unit 23 re-classifies the data C that has been included in the candidate service component (ID=2) outside the candidate service component (ID=2) as common data because the data C is also referred to by the program group E of the external candidate service component (ID=1) in addition to reference by the program group 1.

As a result, the analysis unit 23 generates "1, program group A", "1, data B", "1, program group E", "2, program group 1", "3, data D", and "3, program group 2" as "service component ID, component name". In addition, the analysis unit 23 generates "c1, data A" and "c2, data C" as "common data ID, component name". In addition, the analysis unit 23 stores the generated service components and pieces of common data in the analysis result DB 14.

Figure 8:
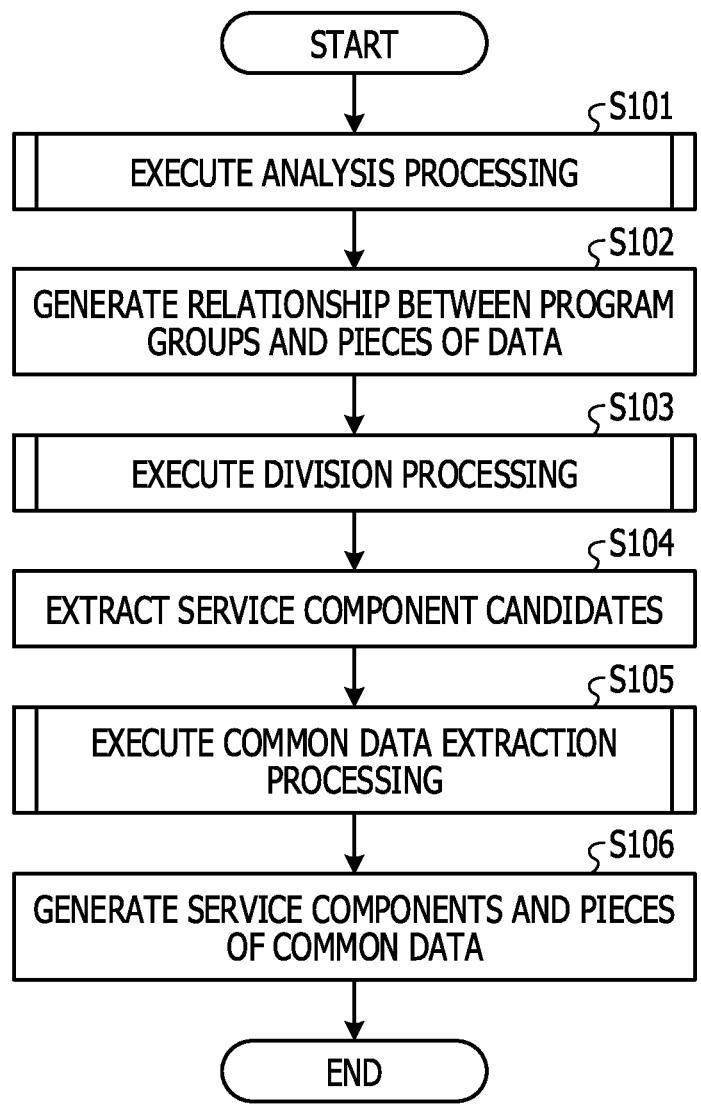
FIG. 8 is a flowchart illustrating an example of the entire processing.

FIG. 8 is a flowchart illustrating an example of the entire processing. As illustrated in FIG. 8, the analysis device 10 executes analysis processing (S101), and generates relationships between program groups and pieces of data in accordance with the analysis result of the analysis processing (S102).

The analysis device 10 executes division processing (S103), and extracts candidate service components in accordance with the result of the division processing (S104). The division processing may be the known processing using the clustering technology or the like such as the technology discussed in Japanese Laid-open Patent Publication No. 2013-148987.

After that, the analysis device 10 executes common data extraction processing by analyzing the candidate service components (S105) and generates service components and the pieces of common data in accordance with the extraction result (S106).

Figure 9:
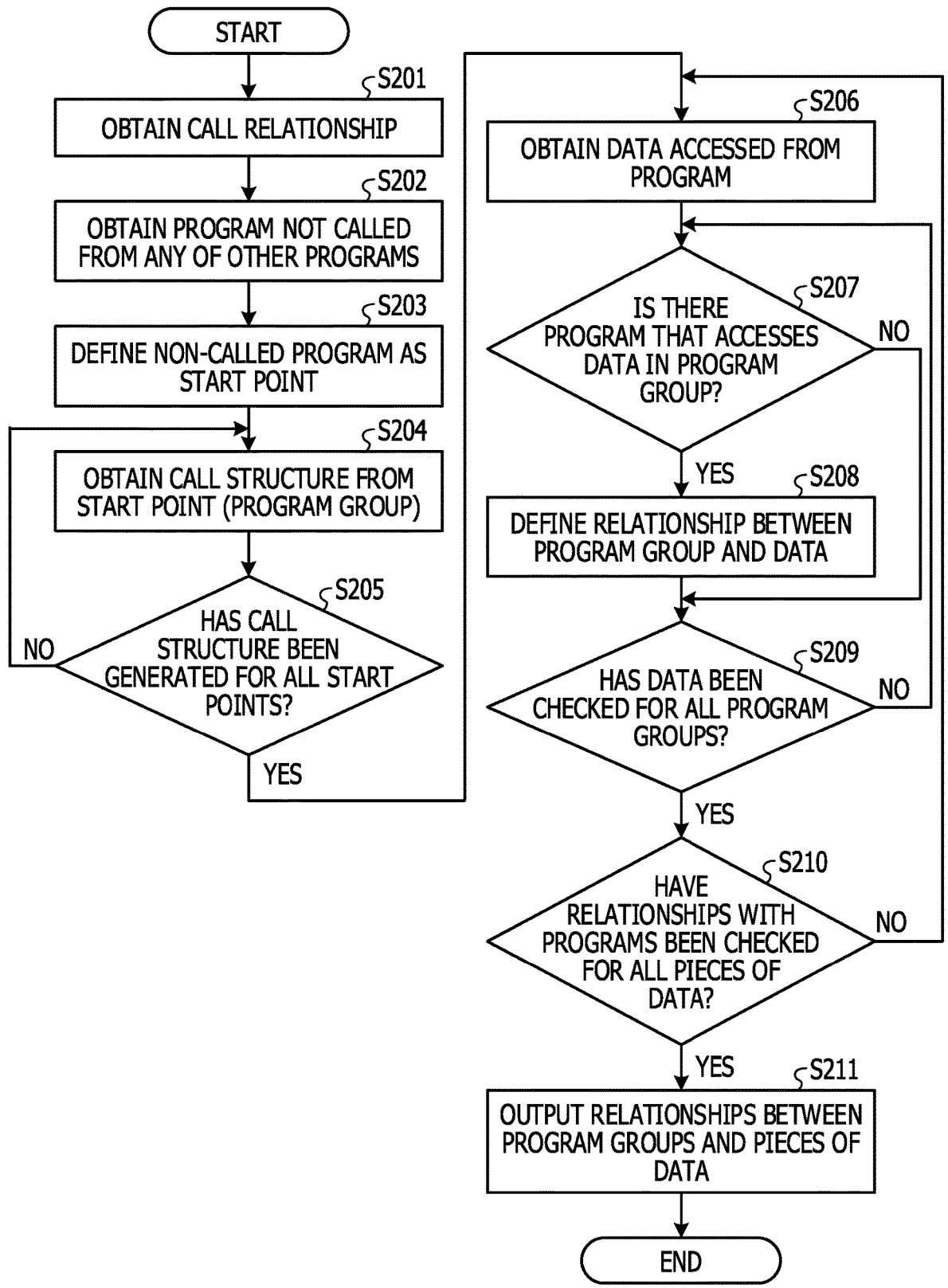
FIG. 9 is a flowchart illustrating an example of analysis processing.

The analysis processing executed in the S101 of FIG. 8 is described below. FIG. 9 is a flowchart illustrating an example of the analysis processing. As illustrated in FIG. 9, the classification unit 21 obtains a call relationship between programs (S201). For example, the classification unit 21 refers to source codes of the program, searches for an instruction to call another program such as a CALL statement, and obtains a call relationship between the programs.

The classification unit 21 obtains a program not called from any of the other programs (S202) and defines the not-called program as a start point (S203).

The classification unit 21 obtains a call structure from the start point (S204) and generates a call structure has been generated for all start points (S205). In addition, the classification unit 21 repeats the processing from S204 until a call structure is generated for all of the start points (S205: No).

When the classification unit 21 generates a call structure for all of the start points (S205: Yes), the classification unit 21 obtains data accessed from a program (S206). The classification unit 21 determines whether there is a program that accesses the data in a program group (S207).

When there is a program that accesses the data in the program group (S207: Yes), the classification unit 21 defines a relationship between the program group and the data (S208) and determines whether data has been checked for all of the program groups (S209). When there is no program that accesses the data in the program group (S207: No), the classification unit 21 executes the processing in S209 without execution of the processing in S208.

When the classification unit 21 has determined that data accessed from a program has been checked for all of the program groups (S209: Yes), the classification unit 21 determines whether relationships with the programs have been checked for all of the pieces of data (S210).

When the classification unit 21 has determined that relationships with the programs have been checked for all of the pieces of data (S210: Yes), the classification unit 21 outputs the relationships between the program groups and the pieces of data to the candidate generation unit 22 and the like (S211). In S209, the classification unit 21 repeats the processing in S207 and the subsequent steps when data accessed from a program has not been checked for all of the program groups (S209: No). Similarly, in S210, the classification unit 21 repeats the processing in S206 and the subsequent steps when relationships with the corresponding programs that have not been checked for all of the pieces of data (S210: No).

Figure 10:
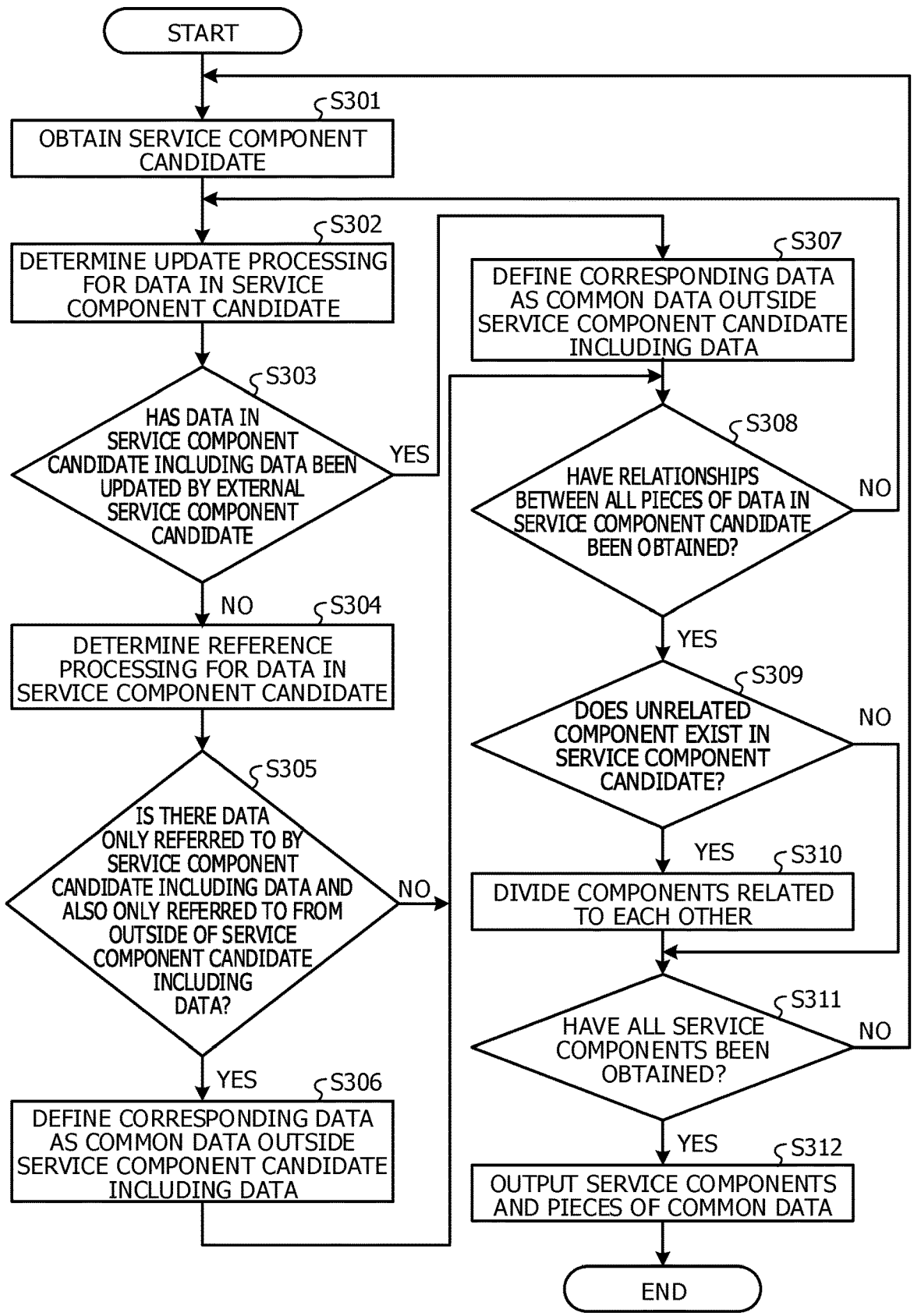
FIG. 10 is a flowchart illustrating an example of common data extraction processing.

The common data extraction processing executed in S105 of FIG. 8 is described below. FIG. 10 is a flowchart illustrating an example of the common data extraction processing. As illustrated in FIG. 10, the analysis unit 23 obtains a candidate service component (S301) and determines update processing for data in the candidate service component (S302). For example, the analysis unit 23 determines whether there is a program group that updates data in the candidate service component.

When data in the candidate service component is not updated by an external candidate service component different from the candidate service component including the data (S303: No), the analysis unit 23 determines reference processing for data in the candidate service component (S304). For example, the analysis unit 23 determines whether there is a program group that refers to data in the candidate service component.

When there is data only referred to by the candidate service component including the data and also only referred to by a source outside of the candidate service component including the data (S305: Yes), the analysis unit 23 defines the corresponding data outside the candidate service component including the data as common data (S306).

In S303, when data in the candidate service component including the data is updated by the external candidate service component different from the candidate service component including the data (S303: Yes), the analysis unit 23 defines the corresponding data outside the candidate service component including the data as common data (S307).

When there is no data only referred to by the candidate service component including the data and also only referred to by a source outside of the candidate service component including the data (S305: No), or after the processing in S306 or S307 has been executed, the analysis unit 23 determines whether relationships of all pieces of data in the candidate service component have been obtained (S308).

When there exists data the access relationship of which is yet to be determined in the candidate service component (S308: No), the analysis unit 23 repeats the processing in S302 and the subsequent steps. When there does not exist data the access relationship of which is yet to be determined in the candidate service component, that is, when relationships of all of the pieces of data in the candidate service component have been obtained (S308: Yes), the analysis unit 23 determines whether an unrelated component exists in the candidate service component (S309).

When an unrelated component exists in the candidate service component (S309: Yes), the analysis unit 23 divides components related to each other (S310). After that, when the analysis unit 23 has obtained all service components, for example, when the analysis unit 23 has determined each of the components that have been classified into the candidate service components (S311: Yes), the analysis unit 23 outputs the obtained service components and the pieces of common data (S312).

When there is a service component that is yet to be determined (S311: No), the analysis unit 23 repeats the processing in S301 and the subsequent steps. In S309, when an unrelated component does not exist in the candidate service component (S309: No), the analysis unit 23 executes the processing in S311 without execution of the processing in S310.

As described above, the analysis device 10 automatically extracts "common data" shared between components that has been partially extracted from the system. Therefore, common data is automatically clarified, data mainly used for common service is defined. In the existing technology, when a relationship or the like remains in which data is updated by a source outside of the candidate service component including the data, the extracted component in which a strong relationship with another component remains, such that an independent "component" that provides a service may not be extracted as an element. In the existing technology, when clustering and weighting are performed after an omnipresent module (modules accessed from many locations) has been removed in advance, many checking works occur, and therefore, such processing may not be realistic.

Figure 11A:
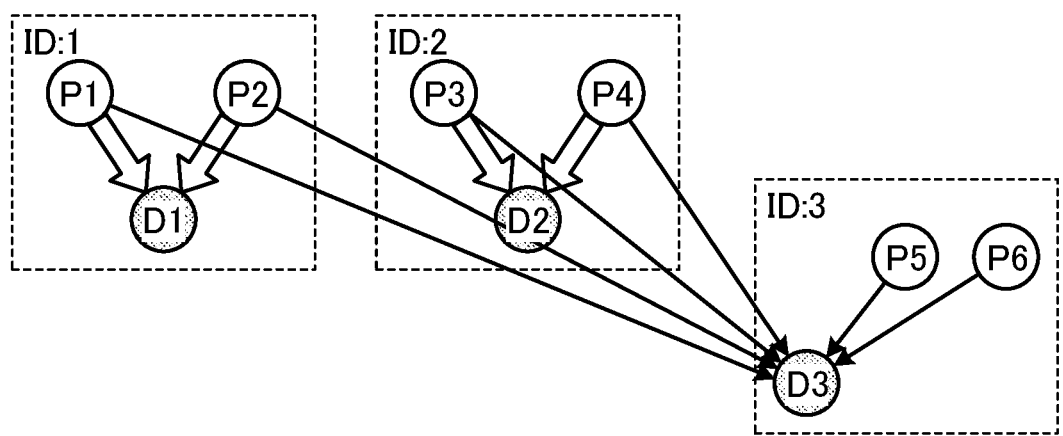
FIGS. 11A and 11B are diagrams illustrating comparison.
Figure 11B:
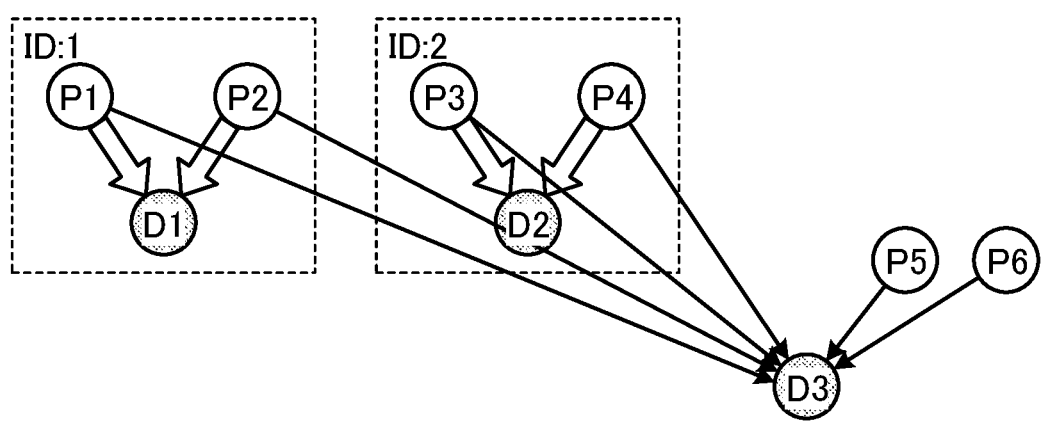

FIGS. 11A and 11B are diagrams illustrating comparison. In FIGS. 11A and 11B, a program is represented by "P", and data is represented by "D". Each element (component) is classified into one of service components, such that, as illustrated in FIG. 11A, D3 accessed from P1, P2, P3, and P4, which are other service components, is classified into a service component (ID=3). Processing to update data may correspond to "owner for the data" that affects to the data greatly because the processing changes the content and the state of the data. Thus, it is desirable that D3 be not classified in any of the service components, and may be defined as a single independent component.

In the case, as illustrated in FIG. 11B, in the method illustrated in FIGS. 8 to 10, D3 are accessed from P1, P2, P3, and P4 that are other service components, such that D3 is defined outside the service component (ID=3). As a result, D3 is also defined as a single independent component. In other words, the analysis device 10 clusters program groups related to data and analyzes a utilized function and an impact range of the data to support loose coupling.

As described above, the analysis device 10 may automatically extract "common data" shared between units that have been partially extracted from the system. Thus, for example, master data, log data, or the like that has been classified as an element in a service component is extracted as a single component. In addition, a service candidate (service component) in which data is not updated by a source outside of the component including the data is presented, such that a subset of data and a program group represented by components each of which is referred to so as to be partially extracted from the system is obtained.

In the example described above, a program that is a start point is searched for from within the program structure, though it is not limited. The start point information may be specified from an outside source by the administrator or the like.

Figure 12:
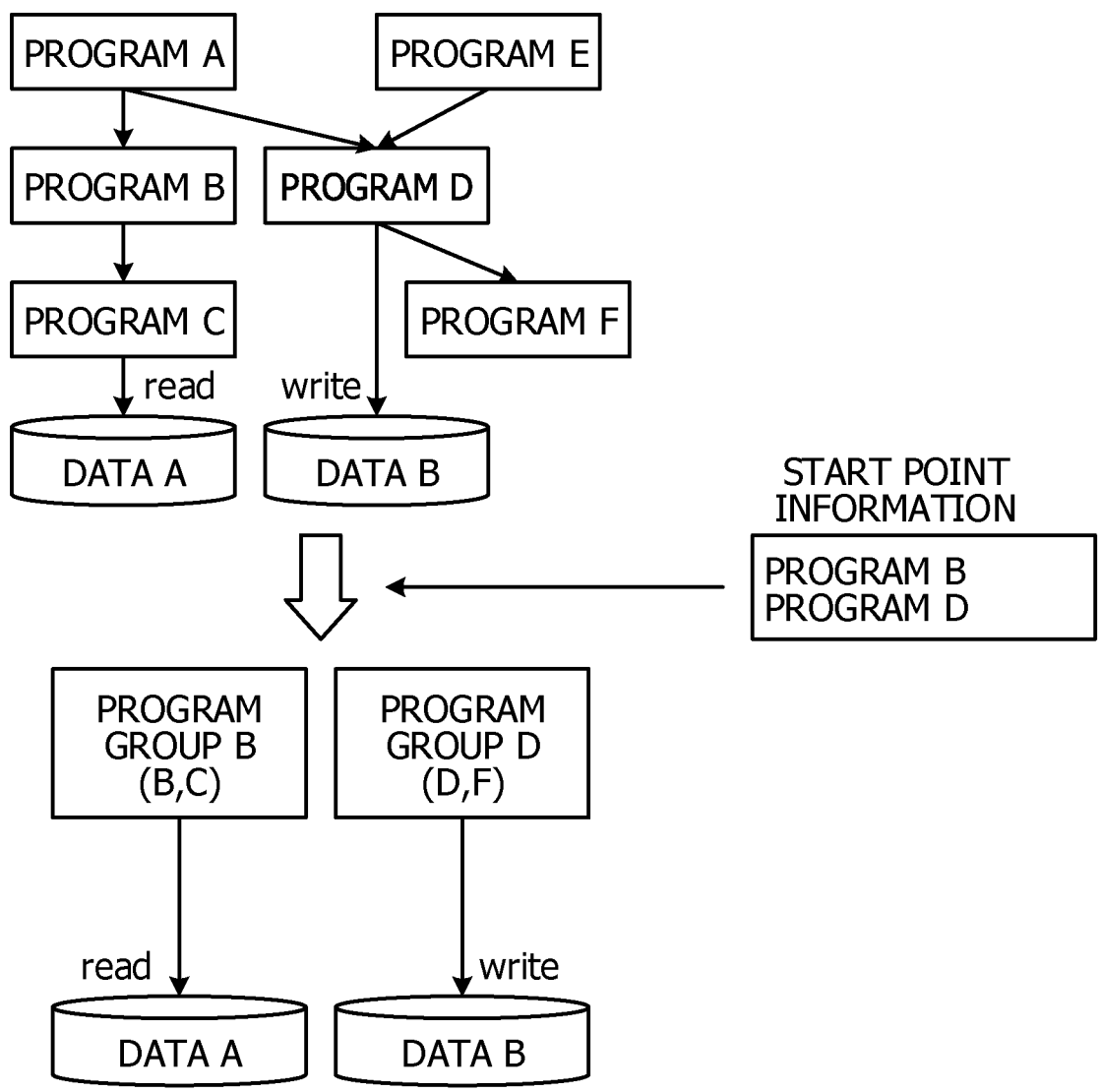
FIG. 12 is a diagram illustrating an example of classification when start point information is specified from an outside source.

FIG. 12 is a diagram illustrating an example of classification when start point information is specified from an outside source. As illustrated in FIG. 12, when "program B, program D" has been specified as start point information in a program structure similar to that of (a) of FIG. 4, the analysis device 10 tracks a call structure from the specified start point.

In FIG. 12, the analysis device 10 may determine programs B and C and reference to data A to be a single piece of processing by tracking the call structure by using the program B as the start point. Thus, the analysis device 10 may define the programs B and C as a program group B and obtain a relationship in which the program group B refers to the data A.

In addition, the analysis device 10 determines programs D and F and update of data B to be a single piece of processing by tracking the call structure by using the program D as the start point. Thus, the analysis device 10 may define the programs D and F as a program group D, and obtain a relationship in which the program group D updates the data B.

Thus, when not all but a part of a program asset is analyzed, a program structure and a relationship with data after a start point are extracted. Thus, an analysis range may be set by the administrator, thereby increasing the convenience.

In the example described above, common data may be separated from program groups, and for example, the program groups from which the common data has been separated may be re-classified.

FIG. 13 is a diagram illustrating an example of re-classification of candidate service components. As illustrated in (a) of FIG. 13, it is assumed that, as candidate service components, a candidate service component (X) including program groups 10, 20, and 30 and pieces of data AA and BB and a candidate service component (Y) including program groups 40 and 50 and data CC are obtained.

The analysis unit 23 investigates common data and service components for the obtained candidate service components. The analysis unit 23 investigates the first candidate service component (X) as the first candidate service component. In the candidate service component (X), the pieces of data AA and BB exist. The data AA is accessed from the program groups 10, 20, 30, and 40, and updated by the three program groups other than the program group 20. The program group 40 updates the data AA from the candidate service component (Y) different from the candidate service component including the data AA. As a result, the analysis unit 23 classifies the data AA as common data. The data BB is referred to only by the program group 30 and not referred to by a program outside the candidate service component (X). Thus, the analysis unit 23 does not classify the data BB as common data.

When it is assumed that the data AA is defined outside the candidate service component (X) as common data, the analysis unit 23 checks a relationship in the candidate service component (X). At this time, the analysis unit 23 checks whether there is a data access relationship between the data and the program groups in the candidate service component (X) after the data AA has been removed from the candidate service component (X). For example, the program group 30 accesses the data BB, such that it is determined that there is an access relationship between the program group 30 and the data BB.

When the data AA has been removed from the candidate service component (X), each of the program group 10 and the program group 20 has no access relationship with another data. Thus, each of the program group 10 and the program group 20 has no relationship with the data BB and the program group 30 in the candidate service component (X). As a result, the analysis unit 23 divides the candidate service component (X) into three components such as a component including the program group 10, a component including the program group 20, and a component including the program group 30 and the data BB.

Whether a target component is allowed to be divided is determined depending on whether there is a data access relationship in the target component. For such determination, a method may be used in which whether there is no node not allowed to be reached when a relationship between a program group and data is seen as a graph of a node and an edge.

The analysis unit 23 determines that data CC which is only accessed from the program groups 40 and 50 not to be common data, for the candidate service component (Y) including the data CC. There is no data sent outside the candidate service component (Y) as common data, such that a relationship between the program groups and the data does not change.

The service components and the common data that have been obtained as described above are illustrated in (b) of FIG. 13. The analysis unit 23 re-classifies the program group 10 as a service component (X-1), re-classifies the program group 20 as a service component (X-2), re-classifies the program group 30 and the data BB as a service component (X-3), and re-classifies the program groups 40 and 50 and the data CC as a service component (Y). Thus, the analysis device 10 re-classifies the candidate service components obtained after the common data has been removed to the outside of the candidate service component (X), such that components having a weak relationship to each other are extracted accurately.

As a method in which the above-described call relationship and data reading relationship are obtained, a known program analysis technology such as a parser may be applied.

A processing procedure, a control procedure, specific names, and information including various pieces of data and parameters, which are described above with reference to the drawings, may be changed arbitrarily unless otherwise specified.

The configuration elements of the illustrated devices are functional concepts and may not be physically configured as illustrated in the drawings. In other words, all or some of the devices may be configured to be distributed or integrated functionally or physically in arbitrary units depending on various loads and usage conditions. All or some of the processing functions executed in the devices may be realized by a central processing unit (CPU) and a program analyzed and executed by the CPU or may be realized as hardware by wired logic.

FIG. 14 is a diagram illustrating an example of a hardware configuration. As illustrated in FIG. 14, the analysis device 10 includes a communication interface 10a, a hard disk drive (HDD) 10b, a memory 10c, and a processor 10d.

The communication interface 10a is a network interface card or the like that controls communication with another device. The HDD 10b is an example of a storage device that stores programs, pieces of data, and the like.

Examples of the memory 10c include a random access memory (RAM) such as a synchronous dynamic RAM (SDRAM), a read only memory (ROM), and a flash memory. Examples of the processor 10d include a CPU, a digital signal processor (DSP), a field programmable gate array (FPGA), and a programmable logic device (PLD).

The analysis device 10 operates as an information processing device that executes a program analysis method by reading and executing a program. The analysis device 10 executes a program having functions similar to the classification unit 21, the candidate generation unit 22, and the analysis unit 23. As a result, the analysis device 10 may execute a process corresponding to the functions similar to the classification unit 21, the candidate generation unit 22, and the analysis unit 23. The above-described program is not limited to a program executed by the analysis device 10. For example, the program may be executed by another computer or a server, or another computer and a server may cooperate to execute the program.

The program may be distributed through a network such as the Internet. The program is recoded to a computer-readable recording medium such as a hard disk, a flexible disk (FD), a compact disc-read-only memory (CD-ROM), a magneto-optical disk (MO), or a digital versatile disc (DVD), and may be executed so as to be read from the recording medium by the computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A program analysis device comprising:
a memory that stores an analysis program; and
a processor coupled to the memory,
the processor, based on the analysis program, preforms operations of:
classifying, based on a call relationship between programs in a program asset including the programs and pieces of data, the programs into program groups;
generating, based on data which is accessed from the programs included in the program groups, one or more first service component candidates each including at least one program group of the program groups and at least one piece of data which is accessed by the at least one program group;
extracting, as common data, first data and second data from among the pieces of data associated with the one or more first service component candidates, wherein the first data is included in a first service component candidate of the one or more first service component candidates as the at least one piece of data and is updated by the at least one program group which is included in another first service component candidate which is other than the first service component candidate including the first data, and the second data is not updated by the one or more program groups and is referred to by at least two program groups in which one program group of the at least two program groups is included in a first service component candidate including the second data and the other program group of the at least two program groups is included in another first service component candidate which is other than the first service component candidate including the second data;
removing the common data from the one or more first service component candidates which include the common data; and
setting one or more second service component candidates corresponding to the one or more first service component candidates in which the common data is removed and the common data as a service component of the program asset.

2. The program analysis device according to claim 1, wherein when a program group included in the one or more second service component candidates does not access data included in the one or more second service component candidates, the processor extracts the program group from the one or more second service component candidates and set the one or more second service component candidates as new one or more second service component candidates.

3. The program analysis device according to claim 1, wherein the processor determines that a program group that updates the data has a strong relationship compared with a program group that refers to the data and generates the one or more first service component candidates.

4. A program analysis method comprising:

classifying, by a computer, based on a call relationship between programs in a program asset including the programs and pieces of data, the programs into one or more program groups;

generating, based on data which is accessed from the programs included in the one or more program groups, one or more first service component candidates each including at least one program group of the one or more program groups and at least one piece of data which is accessed by the at least one program group;

extracting, as common data, first data and second data from among the pieces of data associated with the one or more first service component candidates, wherein the first data is included in a first service component candidate of the one or more first service component candidates as the at least one piece of data and is updated by the at least one program group which is included in another first service component candidate which is other than the first service component candidate including the first data, and the second data is not updated by the one or more program groups and is referred to by at least two program groups in which one program group of the at least two program groups is included in a first service component candidate including the second data and the other program group of the at least two program groups is included in another first service component candidate which is other than the first service component candidate including the second data;

removing the common data from the one or more first service component candidates which include the common data; and setting one or more second service component candidates corresponding to the one or more first service component candidates in which the common data is removed and the common data as a service component of the program asset.

5. The program analysis method according to claim 4, further comprising:

when a program group included in the one or more second service component candidates does not access data included in the one or more second service component candidates, extracting the program group from the one or more second service component candidates and set the one or more second service component candidates as new one or more second service component candidates.

6. The program analysis method according to claim 4, further comprising:

determining that a program group that updates the data has a strong relationship compared with a program group that refers to the data to generate the one or more first service component candidates.

7. A non-transitory computer-readable recording medium storing an analysis program which causes a computer to perform a process, the process comprising:

classifying, based on a call relationship between programs in a program asset including the programs and pieces of data, the programs into one or more program groups;

generating, based on data which is accessed from the programs included in the one or more program groups, one or more first service component candidates each including at least one program group of the one or more program groups and at least one piece of data which is accessed by the at least one program group;

extracting, as common data, first data and second data from among the pieces of data associated with the one or more first service component candidates, wherein the first data is included in a first service component candidate of the one or more first service component candidates as the at least one piece of data and is updated by the at least one program group which is included in another first service component candidate which is other than the first service component candidate including the first data, and the second data is not updated by the one or more program groups and is referred to by at least two program groups in which one program group of the at least two program groups is included in a first service component candidate including the second data and the other program group of the at least two program groups is included in another first service component candidate which is other than the first service component candidate including the second data;

removing the common data from the one or more first service component candidates which include the common data; and setting one or more second service component candidates corresponding to the one or more first service component candidates in which the common data is removed and the common data as a service component of the program asset.

8. The non-transitory computer-readable recording medium according to claim 7, further comprising:

when a program group included in the one or more second service component candidates does not access data included in the one or more second service component candidates, extracting the program group from the one or more second service component candidates and set the one or more second service component candidates as new one or more second service component candidates.

9. The non-transitory computer-readable recording medium according to claim 7, further comprising:

determining that a program group that updates the data has a strong relationship compared with a program group that refers to the data to generate the one or more first service component candidates.

* * * * *